Figure 5:
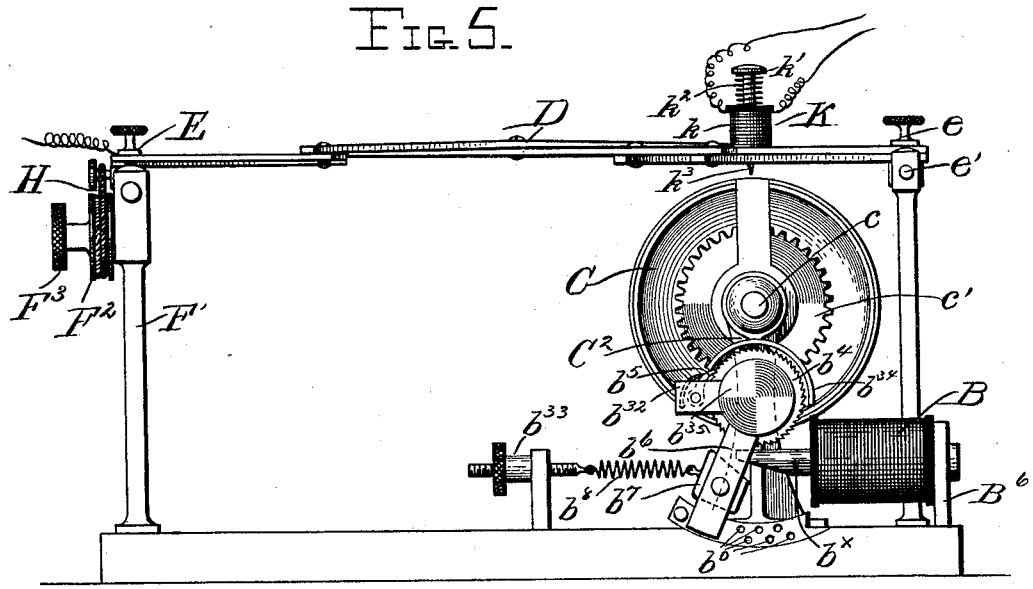

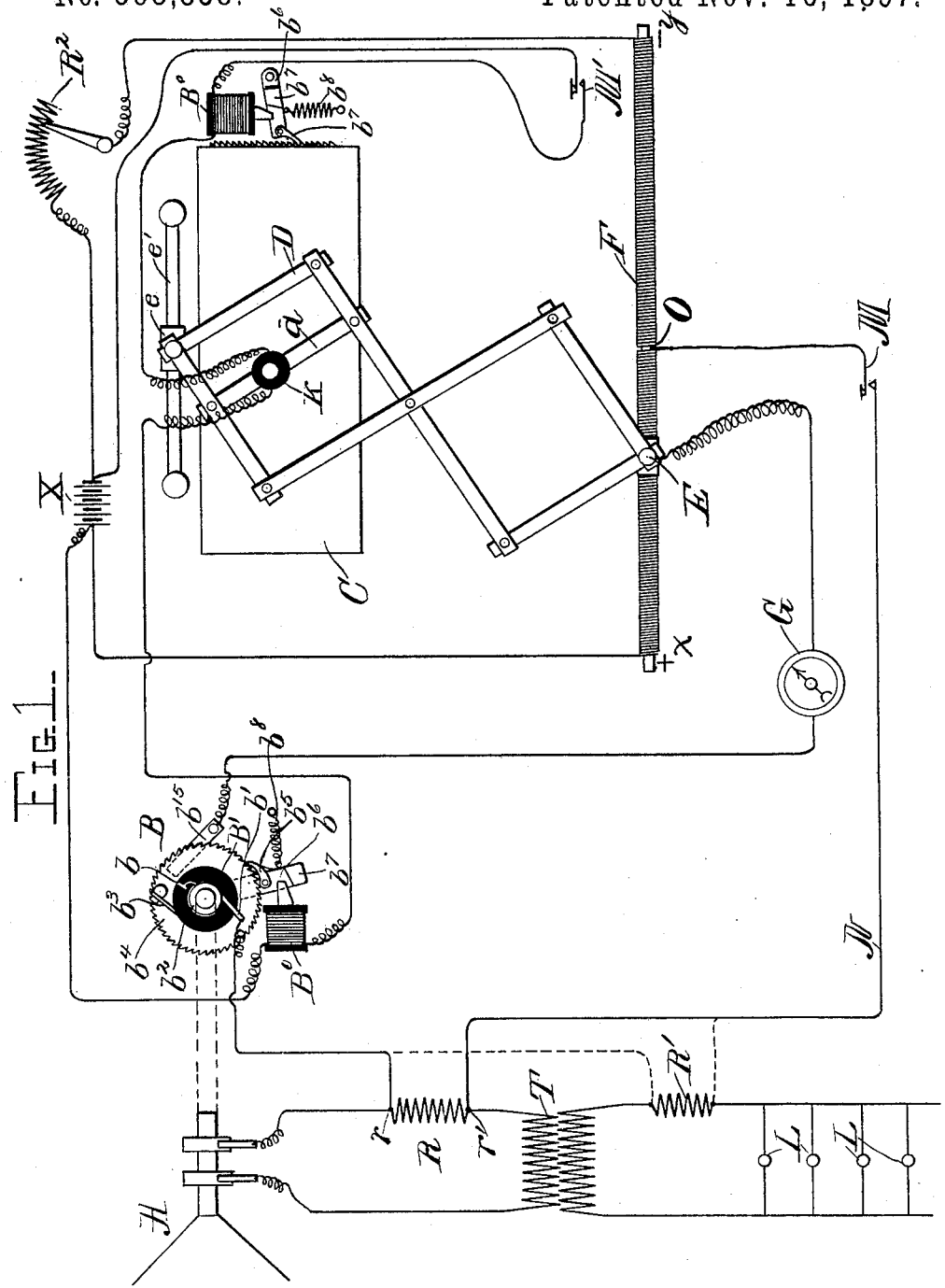

(No Model.) 3 Sheets—Sheet 2.
E. B. ROSA.
INDICATOR FOR ELECTRICAL MEASUREMENTS.
No. 593,858. Patented Nov. 16, 1897.
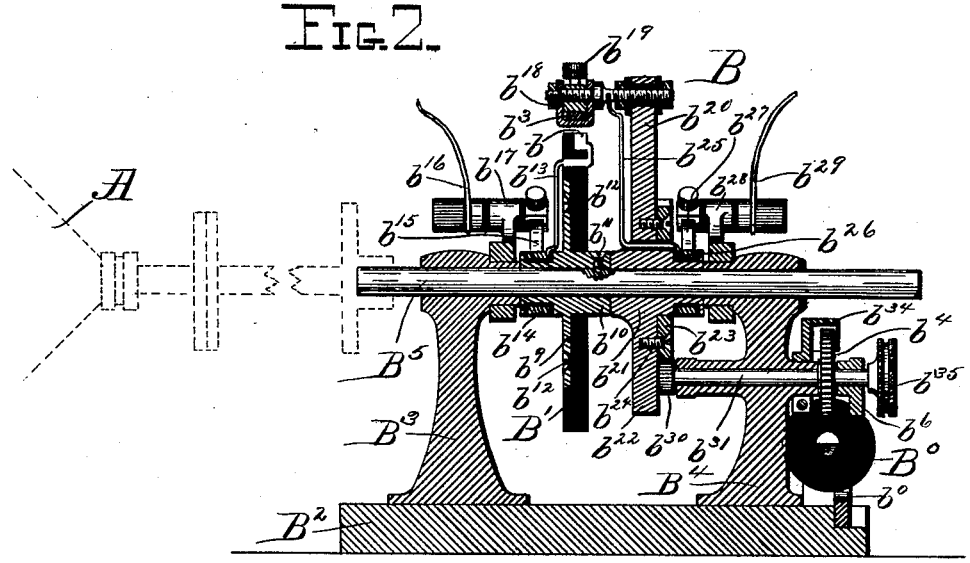
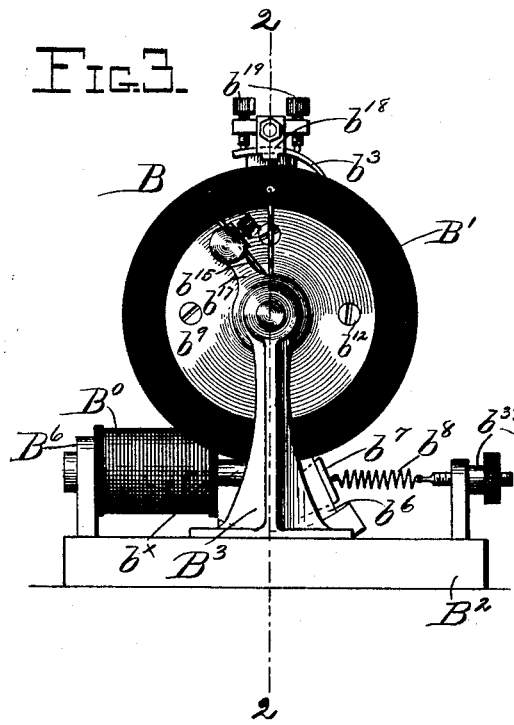
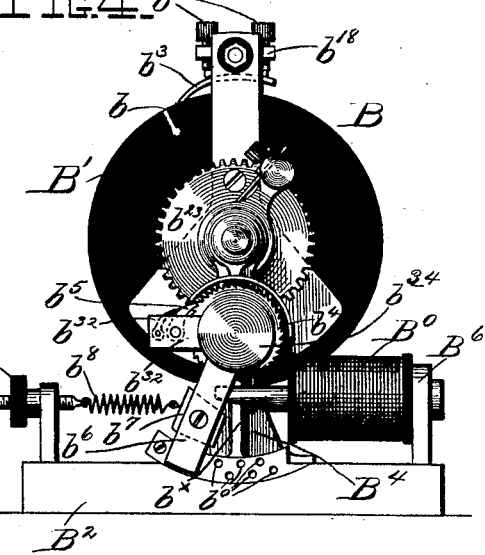
Witnesses
Roy C. Bowen
John H. Holt
Inventor
E. B. Rosa
by Wilkinson & Fisher
Attorneys (No Model.) 3 Sheets—Sheet 3.

E. B. ROSA.
INDICATOR FOR ELECTRICAL MEASUREMENTS.

No. 593,858. Patented Nov. 16, 1897.

Witnesses
Percy C. Bowen
John H. Holt

Inventor
E. B. Rosa
by Wilkinson & Fisher
Attorneys

UNITED STATES PATENT OFFICE.

EDWARD B. ROSA, OF MIDDLETOWN, CONNECTICUT.

INDICATOR FOR ELECTRICAL MEASUREMENTS.

SPECIFICATION forming part of Letters Patent No. 593,858, dated November 16, 1897.

Application filed July 13, 1897. Serial No. 644,431. (No model.)

*To all whom it may concern:*

Be it known that I, EDWARD B. ROSA, a citizen of the United States, residing at Middletown, in the county of Middlesex and State of Connecticut, have invented certain new and useful Improvements in Indicators for Electrical Measurements; and I do hereby declare the following to be a full, clear, and exact description of the invention, such as will enable others skilled in the art to which it appertains to make and use the same.

My invention relates to the measurement and plotting of the instantaneous values of periodic electric quantities—such as currents, electromotive forces, and power; and its object is to provide an apparatus which will enable these quantities to be accurately and rapidly measured and also to be plotted simultaneously and automatically to a predetermined scale. Such record is neat and permanent and shows not only the magnitude and manner of variation of each of such electric quantities, but also shows their phases relatively to one another. This instrument utilizes the so-called "instantaneous-contact method" of measurement. A disk of some non-conducting material is mounted upon a shaft, and the latter is connected with the armature of a dynamo or a synchronous motor, so that in either case it revolves with the same speed as the generator which supplies the current to be measured.

The "brush," which makes contact (once in each revolution) with a metallic knife-edge let into the revolving disk, has heretofore usually been advanced step by step by hand. One of the features of this invention consists in advancing the brush automatically by means of suitable gears driven by a ratchet-wheel, which in turn is actuated by a lever and pawl or an electromagnet and pawl or some other suitable device.

One of the other features of this invention is the measuring-solenoid, by means of which measurements of the electric quantities are quickly and accurately made by a null method, a sliding or rolling contact being adjusted until there is no current in one of the circuits, as shown by no deflection in a galvanometer or by silence in a telephone or by any other suitable means.

Another part of the apparatus is the recording-cylinder, joined to the measuring-solenoid by a pantograph, the latter carrying a pen or pencil or other means of making points. The excursions of the sliding contact, which measure the instantaneous values of the electric quantities, are repeated on a reduced scale by the marking-point of the pantograph, and so transferred to the recording-cylinder, in a manner to be hereinafter described. This being done automatically, the time and labor of measuring and plotting electric curves are by this invention reduced to a small fraction of what they have heretofore been and the accuracy and faithfulness of the curves are much enhanced.

To more fully describe my invention, reference is had to the accompanying drawings, in which—

Figure 6:
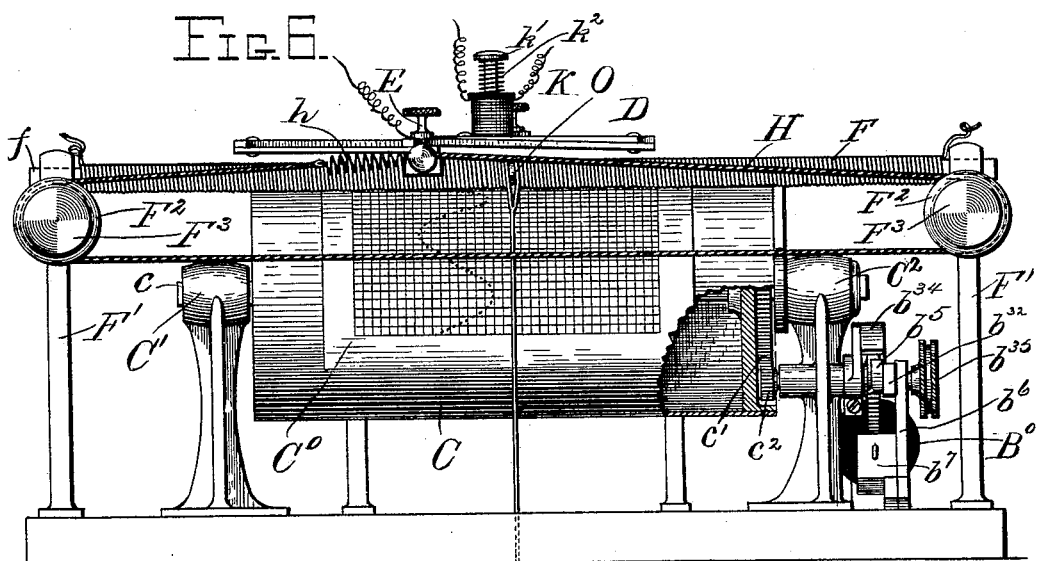
Figures 7, 8:
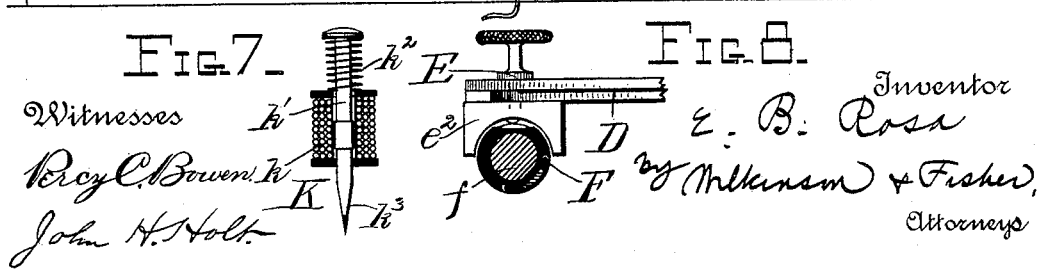

Figure 1 represents my improved apparatus and its electrical connections in diagram, illustrating the operation of the same. Fig. 2 represents a vertical central section of the instantaneous-contact maker, taken along the line 2 2, Fig. 3, and looking in the direction of the arrow. Fig. 3 represents an end elevation of the said instantaneous-contact maker, and Fig. 4 represents an end elevation of the same device as viewed from the opposite end from that shown in Fig. 3 and representing the contact-disk as rotated slightly. Fig. 5 represents an end elevation of the recording-cylinder and its actuating mechanism, together with the pantograph and recorder. Fig. 6 represents a front elevation of the apparatus shown in Fig. 5, with a portion of the recording-cylinder broken away to more clearly show the gearing at the end of said cylinder. Fig. 7 represents an enlarged detail vertical central section of the electromagnetic recorder; and Fig. 8 represents an enlarged detail section of the solenoid, showing the sliding contact-maker mounted thereon.

Similar letters refer to similar parts throughout the several views.

Referring first particularly to Fig. 1, A represents an alternating-current dynamo-electric machine, and B an instantaneous-contact maker, either mounted on the same shaft with the armature of the dynamo or driven in synchronism with the said armature-shaft in any way, either by mechanically connecting the said contact-maker with the said armature-shaft or by driving it by means of a synchronous motor. This contact-maker B, as represented diagrammatically in Fig. 1 and shown in greater detail in subsequent views, consists, among other parts, of an insulating-disk B', having a metallic contact-piece $b$ let into its periphery, and this contact-piece is electrically connected to a ring $b^2$, both disk and ring being mounted on the shaft $B^5$, which may be either the dynamo armature-shaft or another shaft connected to the dynamo armature-shaft in any of the ways above mentioned. A brush $b'$ makes contact with this ring $b^2$, from which the current is conveyed through the contact-piece $b$ to a second brush $b^3$ once in every revolution of the disk B', the said brush $b^3$ being adapted to be rotated step by step around the periphery of the said disk by means of the ratchet $b^4$. This ratchet $b^4$ is actuated by the pawl $b^5$, mounted on the pivoted arm $b^6$, the said arm carrying an armature $b^7$, which is adapted to be attracted by the electromagnet $B^6$ and returned to its normal position by the spring $b^8$.

R and R' represent known resistances, and T a transformer, with its primary coil connected with the dynamo and its secondary provided with any load, as the lamps L.

D represents a pantograph mounted at one end $e$ on a frame $e'$ and at the other end provided with a contact-maker E, which latter is adapted to rest upon and make electrical contact with a solenoid F.

K represents an electromagnetic recorder, and C a cylinder or other surface which is advanced step by step in synchronism with the contact-maker by advancing mechanism similar to that which advances the contact-maker.

G represents a galvanometer, and M M' circuit-closers or switches.

The electrical connections being made substantially as shown in Fig. 1, my method of measuring instantaneous values of a periodic current is as follows: Supposing a current from the alternating-current dynamo A to flow through a known non-inductive resistance R and the primary coil of the transformer T, then, the resistance R being known and non-inductive, as stated, the instantaneous values of the current through it become known when the corresponding difference of potential between the points $r$ and $r'$ are measured; so, also, for the secondary current through R'. Let the current from the battery X flow through the solenoid F and by means of an adjustable resistance $R^2$ keep the difference of potential between $x$ and $y$ constant. If a straight wire is used between $x$ and $y$, only a small difference of potential between its ends can be maintained without overheating the wire. Hence I use a coil or solenoid consisting of a great number of turns of wire wound uniformly in one layer, the insulation being removed along the top for making electrical contact with the contact-maker E, which is free to move over the solenoid from $x$ to $y$.

N represents an electric circuit passing through either of the resistances R or R', through the instantaneous-contact maker B, through the galvanometer G, contact E, and through that portion of the solenoid F between the sliding contact E and a fixed contact O in the center of the solenoid, and M is a key for closing and opening this circuit. It will therefore be seen that when the contact-piece $b$ on the disk of the instantaneous-contact maker comes in contact with the brush $b^3$ an instantaneous current will be sent through the circuit N when the contact M is closed and will, if the sliding contact E is at O, represent the strength of the current of the dynamo A at that particular phase of the cycle corresponding to the position of the brush $b^3$; but if at the instant of the closing of the circuit by the contact-maker B the difference of potential between E O is the same as that between $r$ $r'$ there will be no deflection of the galvanometer. If there is a deflection of the galvanometer, E may be moved one way or the other until there is none. Then the distance E O may be taken as the measure of the difference of potential in R, and hence of the current in the primary circuit. Obviously if the flow of the current is from $r$ to $r'$ the sliding contact E will be placed on the left of O and if from $r'$ to $r$ E will be placed on the right of O. If then the brush $b^3$ of the instantaneous-contact maker is moved through a small angle, contact is made at a different phase of the current, and consequently there will be a new position of E for a balance, the new value of E O being a measure of the current at the instant of contact. In this way by advancing the brush $b^3$ step by step and setting the sliding contact E each time so as to have no deflection of the galvanometer a series of readings may be made from which the curve of current may be constructed point by point. Then connecting the resistance R' instead of R in the circuit N a new set of readings may be taken for the secondary current. In order to avoid the labor of recording numerous readings from the different settings of the contact E and subsequently plotting them by hand I am enabled by my improved apparatus to plot these values automatically as the settings are made. For this purpose the pantograph D is attached to the sliding contact E and carries on the cross-bar $d$ the electromagnetic recording point or pencil K, so that, as shown in the drawings, the distance K $e$ is one-fifth of E $e$, or, obviously, this proportion may be varied at will. Then as E is moved along the solenoid F the space passed over by K will be one-fifth of that passed over by E.

Now, assuming that at the position of E, as shown in the drawings, there is no deflection of the galvanometer G when the contact M is closed and the instantaneous contact is made through the brush $b^3$, then for that position of the brush $b^3$, and hence that phase of the current of the dynamo, the electromagnetic recorder K may be made to print a point on the surface C by closing the contact M', and in addition to actuating the recorder K the current through M' excites the electromagnets $B^0$, which immediately attract their armatures $b^7$ and set the pawls $b^5$, but upon breaking the contact at M' the magnets $B^0$, being no longer excited and the springs $b^8$ withdrawing the armatures, cause the pawls $b^5$ to advance the brush $b^3$ and surface C a predetermined distance, and hence set them in a position for a new reading to be recorded. The contact E is then moved to a new position (the contact M being closed) until the galvanometer ceases to deflect, when the process of recording above described is repeated, and so on for a sufficient number of readings to obtain a curve on the surface C of the electrical quantity thus being determined. This curve is made up of a line of dots, which represent the successive positions of the contact E, and is shown in Fig. 6.

The specific structure of the instantaneous-contact maker is shown in Figs. 2, 3, and 4. $B^2$ represents any suitable base, upon which are mounted the pedestals $B^3$ and $B^4$, and journaled in these pedestals is the shaft $B^5$, which, as before explained, may be either directly coupled to the armature-shaft of the dynamo A or may be driven in synchronism with that shaft in any suitable manner. A metallic disk $b^9$, provided with a collar $b^{10}$, is mounted on the shaft $B^5$ and secured to that shaft by the set-screw $b^{11}$. Upon this disk and collar is mounted the disk of insulating material B', which is secured to the said metallic disk, as at $b^{12}$. Into the periphery of this disk B' is let the metallic contact-piece or knife-edge $b$, which is made to extend through the body of the disk, where it is connected by means of the insulated wire $b^{13}$ to a ring $b^{14}$, carried upon and insulated from the collar $b^{10}$. Making contact with this ring $b^{14}$ is a brush $b^{15}$, which is in electrical connection with the terminal $b^{16}$ and insulated from the arm $b^{17}$, which carries it. The brush $b^3$, which is adapted to sweep over and in contact with the disk B', is mounted in the brush-holder $b^{18}$, the tension of the brush against the disk being regulated by the screws $b^{19}$. This brush-holder is carried by and insulated from an arm $b^{20}$, which is provided with a hub or sleeve $b^{21}$ and is mounted loose on the shaft $B^5$. The lower portion of the arm $b^{20}$ is enlarged, being of sector shape, as shown at $b^{22}$, and to this portion and to the arm proper is secured the gear $b^{23}$ by the screws $b^{24}$. The brush-holder $b^{19}$ is electrically connected by means of the wire $b^{25}$ to a ring $b^{26}$, carried upon the collar $b^{21}$ and insulated therefrom. In contact with this collar $b^{26}$ is a brush $b^{27}$, carried by and insulated from the arm $b^{28}$ and in electrical connection with the terminal $b^{29}$. The gear $b^{23}$ meshes with a pinion $b^{30}$, carried by a shaft $b^{31}$, which latter is journaled in the pedestal $B^4$. This shaft carries the ratchet-wheel $b^4$, by which the said shaft is rotated. Loosely mounted on the shaft $b^{31}$ and just outside of the ratchet $b^4$ is a depending arm $b^6$, which is provided with the horizontal portion $b^{32}$. Secured to this portion of the arm $b^6$ is the pawl $b^5$, in engagement with the teeth of the ratchet $b^4$, and attached to the depending arm $b^6$ is an iron block or armature $b^7$, to which is secured the spring $b^8$, the tension of which spring is regulated by the screw $b^{33}$. The electromagnet $B^0$, secured to the frame $B^6$, is provided with a core $b^\times$ of such shape as will adapt it, when magnetized, to attract the armature $b^7$. When the armature $b^7$ is thus attracted as the magnet $B^0$ becomes excited, it will draw the pawl $b^5$ backward over the ratchet a distance which is regulated by the throw of the arm $b^6$, which throw is regulated by inserting a stop-pin into any of the holes $b^0$, against which the arm will strike and be stopped. Thus when it is required to have the pawl drawn back over one tooth of the ratchet a pin would be inserted in the first hole on the left of the series $b^0$. If required to have it drawn back the distance of two teeth, a pin would be inserted in the second hole, and so on for any number of teeth within practical limits. When the armature $b^7$ is released by the magnet $B^0$, it will, actuated by the spring $b^8$, return to its initial position and cause the pawl to advance, carrying with it the ratchet $b^4$, which, rotating the shaft $b^{31}$, causes the gear $b^{23}$, connected to the pinion $b^{30}$, to rotate, and thus rotate the arm $b^{20}$ and brush $b^3$ through an arc dependent upon the distance through which the arm $b^6$ has been allowed to swing. The shaft $b^{31}$ may be rotated step by step or otherwise by hand by mounting the milled head $b^{35}$ on the end thereof. To prevent the pawl from advancing beyond a fixed point on its upward stroke, a shield $b^{34}$ is mounted on the pedestal $B^4$, against the end of which shield the pawl strikes when the spring has a tendency to advance it too far. Thus it will be seen that once in every revolution of the disk B' contact is made with the brush $b^3$, which completes the circuit from the terminal $b^{16}$ to $b^{29}$, and that at such times as the magnet $B^0$ is excited the said brush $b^3$ is given angular advancement around the periphery of the said disk automatically. It having been shown at what times the magnet $B^0$ becomes excited and the reason for making the instantaneous contact with the brush $b^3$ at different points around a circle, the apparatus by means of which the recording of the electrical quantities is accomplished will next be described.

The recording mechanism is most clearly shown in Figs. 5, 6, 7, and 8, where C represents a cylinder mounted on a shaft $c$, journaled in the pedestals C' and $C^2$. Mounted on the shaft $c$ at one end of the cylinder is the gear $c'$, which meshes with a pinion $c^2$. This pinion is rotated step by step at such times as the magnet B⁰ is excited by mechanism in every respect the same as that which advances the brush $b^3$ of the instantaneous-contact maker, all of which was described in detail with reference to Figs. 2, 3, and 4. The cylinder C is adapted to carry a sheet of paper, preferably coördinate paper C⁰, upon which the record of the values is printed.

The solenoid F consists, as before described, of a great number of coils of insulated wire wound on a core $f$, which core is mounted in the upright F'. The insulation is removed from the top of the wire of the solenoid, so that a contact-maker passing over the said solenoid may make electrical contact therewith. The contact-maker (most clearly shown in the detail view, Fig. 8) consists of a contact-screw E, which passes through a block $e^2$, the latter being grooved on one side to receive the solenoid. The same result may be accomplished by having the solenoid wound with bare wire, with the convolutions separated from each other, and the block $e^2$ made of insulating material. This contact-maker E is shifted along the solenoid by means of the cord H, which passes over the pulleys $F^2$. The spring $h$ between one end of the cord and the contact-maker takes up the slack in the cord, and by turning either of the milled heads $F^3$ the contact-maker is shifted either to the right or left. The sliding contact E is secured to one end of the pantograph D, the other end of which is mounted on the rod $e'$. The end of the pantograph so mounted on the rod $e'$ is adapted to slide thereon and to be clamped in any desired position by the set-screw $e$. The cross-bar $d$ of the pantograph carries the recorder K. This recorder consists of a pointed instrument $k^3$, which may be either a pencil or a sharpened piece of metal, which is secured to an iron core $k'$, and this core $k'$ is adapted to fit loosely in the solenoid $k$, being held in its normal position by the spring $k^2$, so that when a current passes through the coil of the solenoid $k$ the core $k'$ will be drawn down and cause the point $k^3$ to strike the paper under it and thus make a dot thereon, which will represent the value of the electrical quantity at that instant being measured.

The recording may be accomplished by using $k^3$ as a pencil, or a ribbon similar to type-writer ribbons may be placed between the paper and the recording-point and the record taken in that way, or a sheet of carbon-paper may be substituted for the ribbon, and, indeed, there are many ways of making the record visible which are all more or less obvious.

If the dynamo is a four-pole machine, the two ratchets $b^4 b^4$ are advanced the same number of teeth each time and one full wave of current extends half-way around the cylinder. If the dynamo is a two-pole machine, the ratchet on the contact-maker is advanced four teeth, while that on the cylinder advances two. If the dynamo has eight poles, then the ratchet on the contact-maker advances one tooth and that on the cylinder two. For a sixteen-pole machine I advance one tooth on the contact-maker to four on the cylinder, &c., but in any case the current-curves would be drawn to the same scale.

It will readily be seen from the foregoing description that the position of the recording-cylinder is entirely independent of the instantaneous-contact maker, as one may be placed in proximity to the dynamo and the other may be situated in any convenient place; but, on the other hand, they may both be mounted on the same shaft or otherwise mechanically coupled together, and the pawl that advances the ratchet $b^4$ may be actuated by a lever.

By suitably choosing the resistances R and R' the current-curves may be drawn to any desired scale, and by using a large non-inductive resistance in parallel with the circuit of either resistance the current in the parallel circuit will be in phase with the corresponding electromotive force, and hence the curve drawn therefor will be the electromotive-force curve.

I am thus enabled by the herein-described apparatus to plot the curves of many other electrical quantities — as watts or power, magnetization, hysteresis, and eddy-current curves—and, indeed, the apparatus is adapted to a great variety of uses and gives permanent records of great beauty and accuracy.

It will be obvious that instead of tracing the curves on paper carried by a cylinder the cylinder may be replaced by a flat moving surface, which will accomplish the same result.

It will, moreover, be obvious that the herein-described invention is capable of many variations and modifications, which may be made without departing from the spirit of my invention.

What I claim, and desire to secure by Letters Patent of the United States, is—

1. In apparatus for recording instantaneous values of electrical quantities, the combination with an instantaneous-contact maker having a brush adapted to move periodically, of a recording-surface adapted to move in synchronism with said brush, and means for recording the electrical values on said surface, substantially as described.

2. In apparatus for recording instantaneous values of electrical quantities, the combination with an instantaneous-contact maker, of a periodically-moving recording-surface, a solenoid, an electric circuit adapted to pass through said instantaneous contact and through the said solenoid, a movable contact-maker adapted to pass over said solenoid and make contact with the wires thereof, a pantograph attached to said movable contact-maker and a recorder carried by said pantograph whereby the said instantaneous values of the electric current may be recorded on said moving surface, substantially as described.

3. In apparatus for recording instantaneous values of electrical quantities, the combination with an instantaneous-contact maker, of a periodically-moving recording-surface, a solenoid, an electric circuit adapted to pass through the said instantaneous contact and through the said solenoid, a sliding contact adapted to pass over said solenoid and means for recording on said moving surface the values of the electric current obtained from the various positions of said sliding contact-maker, substantially as described.

4. In apparatus for recording the instantaneous values of electrical quantities, the combination with an instantaneous-contact maker, of an electric circuit adapted to pass through said contact, means for reducing the potential in said circuit to zero when closed, and means for automatically making a permanent record of the electric quantities obtained from the different points of zero potential of said circuit, substantially as described.

5. In apparatus for recording instantaneous values of electrical quantities, the combination with an instantaneous-contact maker, of an electric circuit adapted to pass through said contact-maker, means for reducing the potential in said circuit to zero when closed, and a pantograph and moving recording-cylinder whereby the said electrical quantities may be automatically and permanently recorded, substantially as described.

6. In apparatus for recording instantaneous values of electrical quantities, the combination with a movable surface and a record-sheet adapted to be carried thereby, means for imparting step-by-step motion to the said surface, a pantograph and a recorder carried thereby, a solenoid and a sliding contact attached to said pantograph and adapted to travel over said solenoid and in electrical connection with the wire of said solenoid, substantially as described.

7. In apparatus for recording instantaneous values of electrical quantities, the combination with a solenoid, sliding contact-maker, pantograph and recorder, of a movable surface and a record-sheet carried thereby, means for imparting step-by-step motion to said surface and an electromagnet for actuating said means, substantially as described.

8. In apparatus for recording instantaneous values of electrical quantities, the combination with an electrical circuit carrying an alternating current, of an instantaneous-contact maker provided with a brush adapted to move periodically and complete the said circuit at successive points in a cycle of the alternating current, a periodically-moving recording-surface moving in synchronism with the said brush and means for recording on the said recording-surface the values obtained from the various positions of said brush, substantially as described.

9. In apparatus for recording instantaneous values of electrical quantities, the combination with an electric circuit carrying an alternating current, of an instantaneous-contact maker provided with a brush adapted to move periodically and to complete said electric circuit at successive intervals in a cycle of the alternating current, a recording-surface adapted to move periodically and in synchronism with said brush, a pantograph mounted near said recording-surface, a recorder carried by said pantograph, a sliding contact-maker carried by said pantograph and a solenoid adapted to engage said sliding contact-maker, substantially as described.

10. In an instantaneous-contact maker, the combination with a rotatable disk, of a contact-strip mounted in the periphery of said disk, a brush adapted to engage the periphery of said disk, means for conveying the current to and from said contact-strip and brush when the said strip and brush engage each other, and means for automatically imparting angular step-by-step motion to the said brush, substantially as described.

11. In an instantaneous-contact maker, the combination with a shaft, of a disk mounted on said shaft and adapted to revolve therewith, a conducting-strip mounted in the periphery of said disk, a brush adapted to make contact with said conducting-strip once in every revolution of the said disk, an arm carrying said brush, mounted on said shaft and adapted to advance the said brush step by step around the said disk, and means for conveying the current to and away from said brush and contact-piece, substantially as described.

12. In an instantaneous-contact maker, the combination with a shaft, of a disk mounted on said shaft and adapted to rotate therewith, a conducting-strip mounted on the periphery of said disk, a brush adapted to make contact with said conducting-strip periodically, an arm carrying the said brush and mounted on the said shaft, means for conveying the current to and away from the said brush and contact-strip, and an electromagnet for giving angular step-by-step movement to the said arm, substantially as described.

13. In an instantaneous-contact maker, the combination with a shaft, of a disk of insulating material mounted thereon and adapted to rotate therewith, a metallic contact-blade mounted in the periphery of said disk, a brush adapted to engage the periphery of said disk and to make contact with said contact-blade periodically, an arm carrying said brush, means for conducting the current to and away from said brush and contact-blade, means for imparting angular step-by-step movement to said brush and arm, and an electromagnet for actuating the said means, substantially as described.

14. In an instantaneous-contact maker, the combination with a shaft, of a disk mounted on said shaft and adapted to rotate therewith, a contact-blade mounted in the periphery of said disk, a brush adapted to engage the periphery of said disk and to make contact periodically with said contact-blade, means for conducting the current to and away from said brush and contact-blade, an arm mounted loosely on said shaft and carrying said brush, a gear mounted on said arm, a ratchet and pawl for rotating said gear, an electromagnet and spring for actuating said pawl, so that the said brush is advanced step by step around the periphery of the said disk, substantially as described.

15. In an instantaneous-contact maker, the combination with a shaft, of a disk mounted on said shaft and rotating therewith, a contact-blade carried by said disk, a brush adapted to engage the periphery of said disk and to make contact periodically with said contact-blade, means for conveying the current to and away from the said brush and contact-blade, an arm carrying said brush and mounted loosely on said shaft, a gear-wheel attached to said arm, a pinion meshing with said gear, a shaft carrying said pinion, a ratchet and pawl adapted to rotate said shaft and pinion, an arm carrying said pawl, a depending arm secured to said first arm, an armature carried by said depending arm, an electromagnet adapted to attract said armature, a spring adapted to return the said arm and armature to their initial positions, and means for limiting and varying the travel of the said arm, substantially as described.

16. In an instantaneous-contact maker, the combination with a brush and means for instantaneously completing an electric circuit therethrough, of an arm carrying the said brush, a gear-wheel secured to said arm, a pinion meshing with said gear, a shaft carrying said pinion, a ratchet and pawl adapted to rotate said shaft, an arm mounted on said shaft and carrying said pawl, a depending arm secured to the said arm, an armature carried by the said depending arm, an electromagnet adapted to attract said armature, a spring adapted to return the said arm and armature to their initial position when released by the said magnet, and means for varying and limiting the travel of the said pawl, substantially as described.

17. In a device for recording instantaneous values of electrical quantities, the combination with a revoluble cylinder and a record-sheet adapted to be carried thereby, of an electromagnet, an armature adapted to be attracted by said magnet, means for returning said armature to its initial position, a swinging arm carrying said armature, a second swinging arm, means for regulating the travel of said arm, a pawl carried by said second arm, a ratchet actuated by said pawl, and means for imparting rotary motion to said cylinder from said ratchet, substantially as described.

18. In a device for recording instantaneous values of electrical quantities, the combination with a revoluble cylinder and a record-sheet adapted to be carried thereby, of means for imparting step-by-step rotary motion to said cylinder, a pantograph mounted near said cylinder, a recorder carried by said pantograph and adapted to record the said electrical quantities on the said record-sheet, a sliding contact carried by said pantograph and a solenoid adapted to be engaged by said sliding contact, substantially as described.

19. In a device for recording instantaneous values of electrical quantities, the combination with a revoluble cylinder and a record-sheet adapted to be carried thereby, of means for imparting step-by-step rotary motion to said cylinder, an electromagnet for actuating said means, a pantograph mounted near said cylinder, an electromagnetic recorder carried by said pantograph and adapted to operate in synchronism with the aforesaid electromagnet, a sliding contact-maker carried by said pantograph, a solenoid adapted to be engaged by said sliding contact and means for imparting motion to the said sliding contact, substantially as described.

20. The combination with a pantograph of a recorder carried thereby, which consists of solenoid, an iron plunger adapted to be drawn into said solenoid, a spring to return the plunger to its initial position, and a recording-point carried by said plunger, substantially as described.

21. The method of recording instantaneous values of electrical quantities which consists in instantaneously completing an electric circuit at successive intervals in a complete cycle of the alternation of the current, maintaining the potential in the said circuit at zero for each time that the instantaneous contact is made and automatically recording the values of the current on a periodically and synchronously moving surface, substantially as described.

In testimony whereof I affix my signature in presence of two witnesses.

EDWARD B. ROSA.

Witnesses:
WM. J. DE MAURIOC,
ELMER G. DERBY.